(12) United States Patent
Werner et al.

(10) Patent No.: US 6,565,302 B2
(45) Date of Patent: May 20, 2003

(54) THREAD FORMING SCREW

(75) Inventors: Michael Werner, Munich (DE); Herbert Kaufmann, Wolfurt (AU); Romed Staggl, Feldkirch (AU); Johannes Dobler, Rankweil (AU)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/027,844

(22) Filed: Dec. 21, 2001

(65) Prior Publication Data
US 2002/0081171 A1 Jun. 27, 2002

(30) Foreign Application Priority Data
Dec. 22, 2000 (DE) ......................... 100 64 714

(51) Int. Cl.⁷ ............................... F16B 35/04
(52) U.S. Cl. ................. 411/411; 411/423; 411/38.74
(58) Field of Search ........................... 44/411, 412, 423, 44/311, 387.4

(56) References Cited

U.S. PATENT DOCUMENTS 4,576,534 A * 3/1986 Barth
5,885,041 A * 3/1999 Giannuzzi
6,158,939 A * 12/2000 Grossberndt
6,322,307 B1 * 11/2001 Glover

FOREIGN PATENT DOCUMENTS

| DE | 2754870 | * | 6/1979 |
| EP | 102605 | * | 3/1984 |

* cited by examiner

*Primary Examiner*—Flemming Saether
(74) *Attorney, Agent, or Firm*—Sidley Austin Brown & Wood, LLP

(57) ABSTRACT

A thread forming screws including opposite flanks connecting the screw crest region with the screw root region and tapering outwardly toward the root region, with each flank being formed of outer and inner flank sections tapering toward the root sections at different angles, and with the crest region being formed of a first region section (8) extending parallel to a central axis of the screw and a second, inclination region section (7) inclined toward the root region (5) in a direction opposite a setting direction (S) at an angle of from about 10° to about 45°.

10 Claims, 1 Drawing Sheet

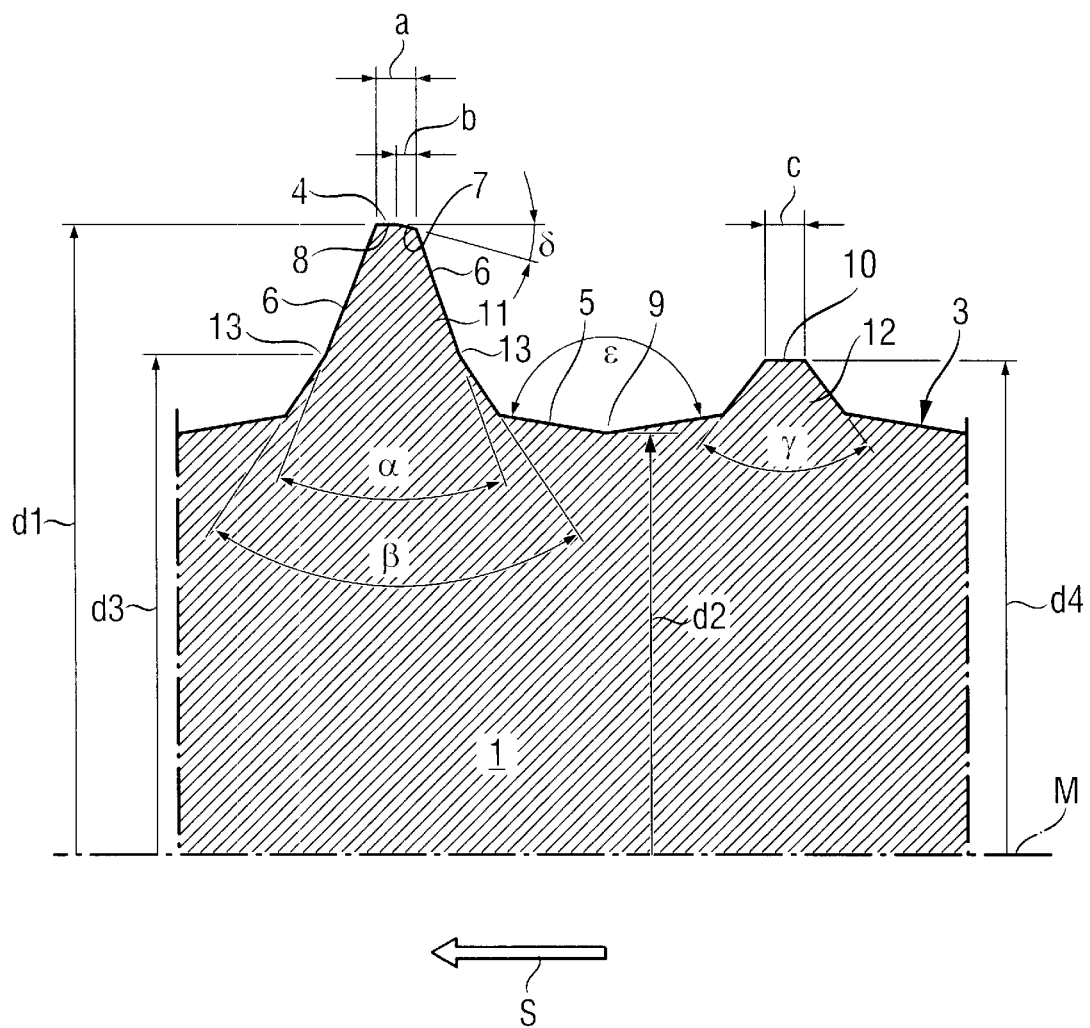

THREAD FORMING SCREW

BACKGROUND OF THE INVENTION

1. Field of the Invention

The present invention relates to a thread forming screw to be set in a hard component such as concrete and having a stem, and a thread profile provided on at least a portion of a longitudinal extent of the stem and formed as a trapezoidal thread having a crest region, a root region, and two flanks connecting opposite ends of the crest region with the root region and tapering outwardly toward the root region, with each flank being formed of outer and inner flank sections with a flank angle formed by the outer flank sections being smaller than a flank angle formed by the inner flank sections.

2. Description of the Prior Art

Screws of the type described above serve for securing objects on hard constructional components such as, e.g., concrete. To this end, a bore is formed in the constructional component in which the screw is set. Upon being screwed into the bore, the thread profile provided on the screw stem cuts or rolls a thread in the wall of the bore. Because of the hardness and brittleness of the constructional component, the thread profile of the screw should have a specific shape.

A screw of the type discussed above is disclosed in German Utility Model DE-U1-93 02 186. The trapezoidal thread of the screw has a root region, a crest region that defines the outer diameter of the screw thread, and flanks that connect the crest region with the root region and are formed of outer and inner flank sections forming different flank angles toward the root region, with the outer flank sections forming an angle of 30° and the inner flank section forming an angle of 60°. By forming the inner flank sections with a greater flank angle than the outer flank sections, advantageously, the thread is reinforced in the root region due to the increase of the material thickness in this region. In particular for hard constructional components, providing a thread with a reinforced root region increases substantially the load-carrying capability of the screw disclosed in DE-01-93 02 186.

However, because of the high friction between the bore wall and the crest region of the thread, the screw does not have adequate screw-in characteristics.

Moreover, the manufacturing of this screw is rather expensive as several steps are required in order to provide the screw with the desired thread profile.

Accordingly, an object of the present invention is to provide a thread forming screw having adequate screw-in characteristics.

Another object of the present invention is to provide a thread forming screw that can be economically produced.

SUMMARY OF THE INVENTION

These and other objects of the present invention, which will become apparent hereinafter, are achieved by forming the crest region of a first region section extending parallel to a central axis of the screw and a second, inclination region section inclined toward the root region in the direction opposite the setting direction at an angle from about 10° to about 45°.

The provision of the inclination region section in the crest region permits to improve the flow characteristics of a material, e.g., steel which is used for forming the screw. The improved flow characteristic permits, in turn to obtain a precise geometry of the thread and, as a result, optimal screw-in characteristics. On the other hand, providing an inclined flank section permits to obtain, during the setting of the inventive screw into the constructional component, a so-called "snow plow effect" which consists in that the material, which is comminuted by the outer crest region, is carried away by the inclination section, and is compressed by an excess material thickness section resulting from the increased flank angle formed by the inner flank sections. The first region section of the crest region functions as a chisel, removing the wall material.

To insure optimal cutting off, comminuting, and carrying away the wall material, advantageously the extent of the crest region in the setting direction corresponds to about 1–4 times of the extent of the inclination region section in this direction. Dependent on the screw dimensions and operational characteristics, the extent of the region can correspond (coinside) substantially with the extent of the inclination region section.

Advantageously, the root region has a two-sided recess forming a root angle of about 150°–170°. This angle proved to be optimal to insure that sufficient material is available for formation of the thread. Otherwise, an excess accumulation of the comminuted material in the recess would take place, preventing the increase of friction between the screw and the wall of the bore upon the screw being screwed-in.

In an advantageous embodiment of the inventive screw, an equal-sided recess is formed. This permits to precisely define, during the manufacturing of the inventive screw, the yield limit.

To obtain optimal screw-in characteristics, the thread profile is advantageously formed as a double thread, with the two-section flanks being provided on the first, in the setting direction, thread, with the outer flank sections forming a flank angle of from about 30° to about 50° and the inner flank sections forming a flank angle from about 60° to about 90°.

For manufacturing reasons, the second thread is formed with flanks having a flank angle of from about 60° to about 90°.

In order to obtain, during setting of the inventive screw, an optimal ratio between the material carrying-away step and the compression step of the comminuted material, the thread is so formed that the maximum outer diameter of the first thread preferably corresponds to from 1.1 to 1.3 times of the maximum outer diameter of the second thread.

Further, preferably, the break point between first and second flank section is so selected that its diameter corresponds approximately to 1.2 times of the core diameter of the screw.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

Single FIGURE of the drawings shows a cross-sectional profile of a thread forming screw according to the present invention.

DETAILED DESCRIPTION OF THE PREFERRED EMBODIMENT

A thread forming screw according to the present invention, in particular a concrete screw, a cross-sectional profile of which is shown in the drawing, has a stem 1 provided with a tip (not shown) facing in a setting direction S and with a thread profile 3. The thread profile 3 is formed as a trapezoidal thread. A crest region 4, which defines an outer diameter d1, is connected with a root region 5, by outwardly tapering toward the root region 5, flanks 6. The thread can be formed as a double thread, as shown in the drawing, or as a single thread. For the sake of clarity, the drawing shows only one side of the thread profile 3 and the central axis M of the inventive screw.

The crest region 4 has a first region section 8, which extends parallel to the central axis M, and a second inclination region section 7 which is inclined toward the root region at an angle $\delta$, e.g., of 15°. The inclination region section 7 adjoins the parallel to the central axis region section 8 at the end of the region section 8 facing in a direction opposite the setting direction S. When the thread profile 3 is formed as a double thread, the crest region 10 of the second thread 12 does not have an inclination region.

The flanks 6 of the first thread 11 have two different flank angles $\alpha$ and $\beta$, with the outer flank angle $\alpha$ being smaller than the inner flank angle $\beta$. The outer flank angle $\alpha$ can be equal, e.g., 40° and the inner flank angle $\beta$ can be equal, e.g., 75°. The flank angle $\gamma$ of the second thread 12 can be equal, e.g., also 75°.

The root region 5 has an equal-sided recess 9 with a root angle $\epsilon$ of, e.g., 162°.

The maximum outer diameter d1 of the first thread 11 corresponds, e.g., to 1.24 times of the maximum outer diameter d4 of the second thread 12. Further, the diameter d3 of the break point 13 of the first thread 11 corresponds, e.g., to 1.2 times of the core diameter d2 of the screw.

The extent of the crest region 4 of the first thread 11 in the setting direction S corresponds to the extent C of the crest region 10 of the second thread 12. The extent a, in the setting direction of the crest region 4 of the first thread 11 corresponds to a double of the extent b of the inclination region section 7 in the setting direction.

Though the present invention was shown and described with references to the preferred embodiment, such are merely illustrative of the present invention and are not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments with in the spirit and scope of the present invention as defined by the appended claims.

What is claimed is:

1. A thread forming screw for setting in a hard constructional component, comprising a stem (1); and a thread profile (3) provided on at least a portion of a longitudinal extent of the stem and formed as a substantially trapezoidal thread having a crest region (4), a root region (5), and two flanks (6) connecting opposite ends of the crest region (4) with the root region (5) and tapering outwardly toward the root region (5), each flank being formed of outer and inner flank sections with a flank angle formed by the outer flank sections of opposite flanks (6) being smaller than a flank angle formed by inner flank sections, and the crest region (4) being formed of a first region section (8) extending parallel to a central axis of the screw and a second, inclination region section (7) inclined toward the root region (5) in a direction opposite a setting direction (s) at an angle ($\delta$) of from about 100 to about 45°.

2. A screw according to claim 1, wherein an extent (a) of the crest region (4) in the setting direction (s) corresponds to about from 1 to 4 times of an extent (b) of the second, inclination region section (7) in the setting direction.

3. A screw according to claim 1, wherein the root region (5) has a two-sided recess (9) forming a root angle ($\epsilon$) from about 150° to about 170°.

4. A screw according to claim 3, wherein the recess (9) is formed as an equal-sided recess.

5. A screw according to claim 1, wherein the trapezoidal thread is formed as a double thread, wherein a first, in the setting direction, thread (11) has opposite flanks (6) forward each of two flank sections, and wherein first flank sections form a first flank angle ($\alpha$), and second flank sections form a section flank angle ($\beta$) different from the first flank angle ($\alpha$).

6. A screw according to claim 5, wherein the second thread (12) has straight flanks.

7. A screw according to claim 6, wherein the flanks of the second thread form an angle ($\gamma$) from about 60° to 90°.

8. A screw according to claim 5, wherein a maximum outer diameter (dl) of the first thread (11) corresponds to 1.1 to 1.3 times of a maximum outer diameter (d4) of the second thread (12).

9. A screw according to claim 1, wherein the first flank angle ($\alpha$) amounts to from about 30° to about 50°, and the second flank angle ($\beta$) amounts to from about 60° to 90°.

10. A screw according to claim 1, wherein a diameter (d3) of a break point (13) formed by two flank sections corresponds approximately to 1.2 times of a core diameter (d2) of the screw.

* * * * *